United States Patent
Donaldson

(10) Patent No.: US 10,110,580 B2
(45) Date of Patent: *Oct. 23, 2018

(54) SECURE DYNAMIC ADDRESS RESOLUTION AND COMMUNICATION SYSTEM, METHOD, AND DEVICE

(71) Applicant: Willie L. Donaldson, Arlington, VA (US)

(72) Inventor: Willie L. Donaldson, Arlington, VA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/085,237

(22) Filed: Mar. 30, 2016

(65) Prior Publication Data
US 2017/0085549 A1    Mar. 23, 2017

Related U.S. Application Data

(60) Provisional application No. 62/140,889, filed on Mar. 31, 2015.

(51) Int. Cl.
*H04L 29/06* (2006.01)
*H04L 29/12* (2006.01)
*H04L 29/08* (2006.01)

(52) U.S. Cl.
CPC .............. *H04L 63/08* (2013.01); *H04L 29/06* (2013.01); *H04L 61/10* (2013.01); *H04L 61/1511* (2013.01); *H04L 61/2076* (2013.01); *H04L 61/6009* (2013.01); *H04L 63/0428* (2013.01); *H04L 67/20* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 6,058,168 A | * | 5/2000 | Braband | H04M 11/06 379/93.02 |
| 6,282,183 B1 | * | 8/2001 | Harris | G06Q 10/109 370/230 |
| 7,543,067 B2 | * | 6/2009 | Matsubayashi | G06F 9/546 709/207 |
| 7,721,093 B2 | * | 5/2010 | Sundararajan | H04L 63/061 380/283 |

(Continued)

FOREIGN PATENT DOCUMENTS

| | | |
|---|---|---|
| WO | WO2016160957 A1 | 10/2016 |
| WO | WO2016160977 A1 | 10/2016 |

*Primary Examiner* — Taghi Arani
*Assistant Examiner* — Badri Champakesan
(74) *Attorney, Agent, or Firm* — Malloy & Malloy, PL

(57) ABSTRACT

The present invention is directed to a method for providing secure dynamic address resolution and communication directly between two nodes, without communication to third party DNS and/or MX server(s). A first a second node are initially paired, which may include the identification of an authentication scheme and creating a DNS record with the current address of the other node, the address of the other node may be dynamically updated. Further secure transmission of messages may be implemented, which include first resolving based on the DNS record a current address of the other node, authentication the destination node, and transmitting a message upon successful authentication. Dynamic message encryption and the provision of a DNS cache may further be implemented.

19 Claims, 11 Drawing Sheets

(56) References Cited

U.S. PATENT DOCUMENTS

| | | | |
|---|---|---|---|
| 8,032,165 B2* | 10/2011 | Dudziak | H04L 63/045 455/411 |
| 8,189,768 B2* | 5/2012 | Raniere | H04L 63/0478 380/28 |
| 8,474,053 B2* | 6/2013 | Branson | G06F 21/52 709/200 |
| 8,578,166 B2* | 11/2013 | De Monseignat | H04L 63/0823 713/175 |
| 8,594,331 B2* | 11/2013 | Jordan | H04L 63/068 380/273 |
| 8,687,804 B2* | 4/2014 | Dillaway | H04L 63/20 380/44 |
| 9,740,781 B2* | 8/2017 | Statia | G06F 17/30864 |
| 9,813,337 B2* | 11/2017 | Trace | H04L 45/742 |
| 2007/0183457 A1* | 8/2007 | Leitch | H04L 45/00 370/498 |
| 2007/0277030 A1* | 11/2007 | Jobbagy | G06Q 20/3829 713/154 |
| 2009/0055917 A1* | 2/2009 | Miyazawa | G06F 21/335 726/10 |
| 2009/0147699 A1* | 6/2009 | Ruy | H04L 29/12254 370/254 |
| 2011/0153630 A1 | 6/2011 | Vernon et al. | |
| 2011/0238801 A1* | 9/2011 | Bahl | H04L 29/12066 709/221 |
| 2014/0258707 A1* | 9/2014 | Denny | H04L 9/0822 713/150 |
| 2015/0222667 A1* | 8/2015 | Nayshtut | G06F 11/30 726/1 |
| 2015/0350044 A1 | 12/2015 | Thomassian et al. | |
| 2015/0381820 A1* | 12/2015 | Ting | H04M 7/0075 370/259 |
| 2016/0094557 A1 | 3/2016 | Kadur et al. | |
| 2016/0164875 A1* | 6/2016 | Zhang | H04L 63/101 726/4 |
| 2016/0294767 A1* | 10/2016 | Donaldson | H04L 61/1511 |
| 2017/0085549 A1* | 3/2017 | Donaldson | H04L 29/06 |

\* cited by examiner

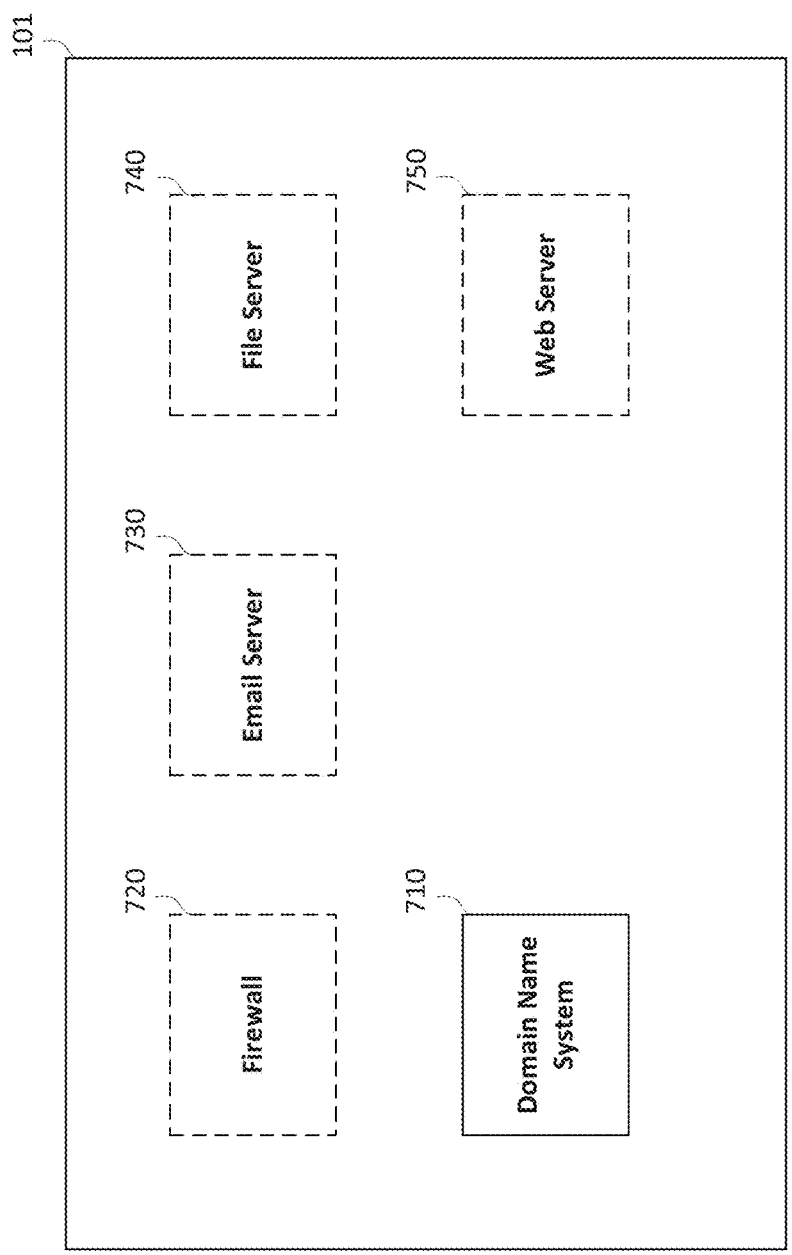

node1 configuration

🔍 http://node1.local

Domains

| | Type | Current Address | |
|---|---|---|---|
| user@domain.xyz | Email | 1.23.45.67.890 | edit / delete |
| domain.xyz | Web | 1.23.45.67.890 | edit / delete |
| user@ispmail.xyz | Email | 13.45.23.432 | edit / delete |
| | | | add |

Aliases

| | Forwarding Address | |
|---|---|---|
| *@node1.local | admin@node1.local | edit / delete |
| | | add |

Mailboxes

| | | |
|---|---|---|
| admin@node1.local | | edit / delete |
| | | add |

Firewall

| | |
|---|---|
| Outbound Services | edit |
| Inbound Services | edit |

Figure 8

SECURE DYNAMIC ADDRESS RESOLUTION AND COMMUNICATION SYSTEM, METHOD, AND DEVICE

CLAIM OF PRIORITY

The present application claims priority from U.S. Provisional Patent Application No. 62/140,889 filed on Mar. 31, 2015, which is incorporated herein by reference in its entirety.

BACKGROUND OF THE INVENTION

Field of the Invention

The present invention generally relates to a secure dynamic address resolution and communication protocol, and related systems, methods, and devices for mitigating network vulnerabilities. Specifically, the present invention provides for the secure and local name resolution and communication between devices connected to one another over any available network using a proprietary communications protocol, wherein the devices can resolve each other's addresses directly without the use of a third party domain name system and/or mail exchange system, even upon network or device(s) changes.

Description of the Related Art

The Domain Name System (DNS) is a hierarchical distributed naming system for computers, services, and various devices and resources connected to a network such as the Internet or other network. Most prominently, a DNS translates domain names to numerical IP addresses so devices can communicate with each other via their domain names, which are more easily memorized by humans as compared to a series of numeric numbers. In other words, DNS functions as the Internet's primary directory service, much like a telephone book, for associating a name (e.g., domain.com) to a numeric Internet Protocol (IP) address (e.g., 1.23.45.678).

DNS is used in various application layer communications such as in web communication or email communication. In web communication, such as via the Hypertext Transfer Protocol (HTTP) protocol, a web URL such as http://www.domain.xyz can therefore be resolved to a numeric IP address 1.23.45.678, such that a user may access a remote web server and website via a standard web browser. In email communication, such as those carried by the Simple Mail Transfer Protocol (SMTP), the "domain.xyz" portion of a "user@domain.xyz" email address is resolved via a DNS in order to retrieve a mail exchanger (MX) record of the host, so that a message can properly reach its intended destination.

Unlike a telephone book directory, a central DNS directory can be updated quickly in the event of server changes or hardware changes, without affecting end users. That is, an important function of DNS today is its central role in distributed Internet services such as in cloud services or in content delivery networks. The key advantage is that unlike a phone book, different users can simultaneously resolve different translations of the same domain name, to different a proximal servers that provide faster response times to the end users.

However, major fallbacks of the DNS system are primarily related to security concerns. For example, one susceptibility of a third party or public DNS system is the subversion of a resolution query, in that a DNS may be hijacked or redirected to an unintended host. In web communication, an unaware user may be redirected to a malicious website mirroring a real website, which may then "phish" or misappropriate that user's information such as login credentials and other user information. In email communication, a transmitted message may be redirected to a dummy host in order to intercept that message. Such DNS hijacking may be performed when a computer's TCP/IP configurations are overwritten to point to a rogue DNS server under the control of an attacker, or through modifying behaviors of a trusted DNS server to create such a noncompliant resolution or redirect.

Accordingly, there is a need in the industry for a secure dynamic address resolution and communication protocol, which provides additional security in address resolution, while remaining backwards compatible with modern communication protocols, in one embodiment.

SUMMARY OF THE INVENTION

The present invention is generally directed to a secure dynamic address resolution and communication protocol, including accompanying systems, methods, and devices thereof. Primarily, the present invention, including accompanying devices, systems, and methods, are intended to mitigate various vulnerabilities in transmission, routing, acceptance, communication, and storage of data between two or more nodes or devices.

Accordingly, a method of the present invention may include first pairing a plurality of nodes, including a first node and second node, also known as a "handshake". The initial pairing may require initial entry of an identifier or code generated on each of the two devices or nodes, of the other device with which to be paired. An authentication scheme is identified between each set of paired nodes, such as the first and second node pair. The authentication may comprise unique keys, passcodes, certificates, or other known methods of authentication two nodes or devices. A DNS record may be created on the first node having a current address of the second node, and on the second node having a current address of the first node. These DNS records may be updated dynamically. That is, a new address associated with the second node may be received at the first node, when the address on the second node changes. This new address may then be stored as the current address associated with the second node on the first node. The previous address of the second node may be stored within a DNS cache on the first node.

A message may be transmitted from the first node to the second node, in which the current address associated with the second node is resolved at the first node, based on the first node's DNS record. The current address associated with the second node is then authenticated, to ensure the identity of the second node (and also the first node, from the second node's perspective). If the authentication fails or if the second node is not reachable, a previous address within the DNS cache may be utilized in another attempt, until the cache is exhausted. The advantage of this step is to ensure that the message is transmitted to the proper addressee, and from the addressee's standpoint, to prevent any unauthorized or spam messages. Only upon successful authentication, is the message transmitted from the first node to the second node. The first node may receive messages from the second node in a similar fashion. In one embodiment, the message may be encrypted for transmission, down to the character level. The encryption may be dynamic, such as to change after each message, or at other predetermined intervals or conditions, such as upon an address change associated with a node. The encryption may occur at the beginning, end, or as an aggregate encryption map that is submitted or negotiated separately from each packet so that the header details may not be submitted within the same transmission.

In one embodiment, a "kill-switch" may be implemented in the event of a termination condition, such as to disengage the second node from at least the first node. A kill-switch may be transmitted via a message or email to a node to be terminated, and/or through a packet injection or P2P TCP dump with unique authentication factors. Upon receiving a termination command, all records at the receiving node may be erased.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6C is a flow chart illustrating a method for providing secure dynamic address resolution and communication between a plurality of nodes of the present invention.

FIG. 7 is a diagrammatic representation of an exemplary node for providing secure dynamic address resolution and communication.

FIG. 8 is an exemplary wireframe illustrating configurations of an exemplary node for providing secure dynamic address resolution and communication.

Like reference numerals refer to like parts throughout the several views of the drawings.

DETAILED DESCRIPTION OF THE PREFERRED EMBODIMENT

As schematically represented in the accompanying drawings, the present invention is generally directed to a secure dynamic address resolution and communication protocol, including accompanying systems, methods, and devices thereof.

A. Overview of Implementation System(s) and Device(s)

Figure 1:
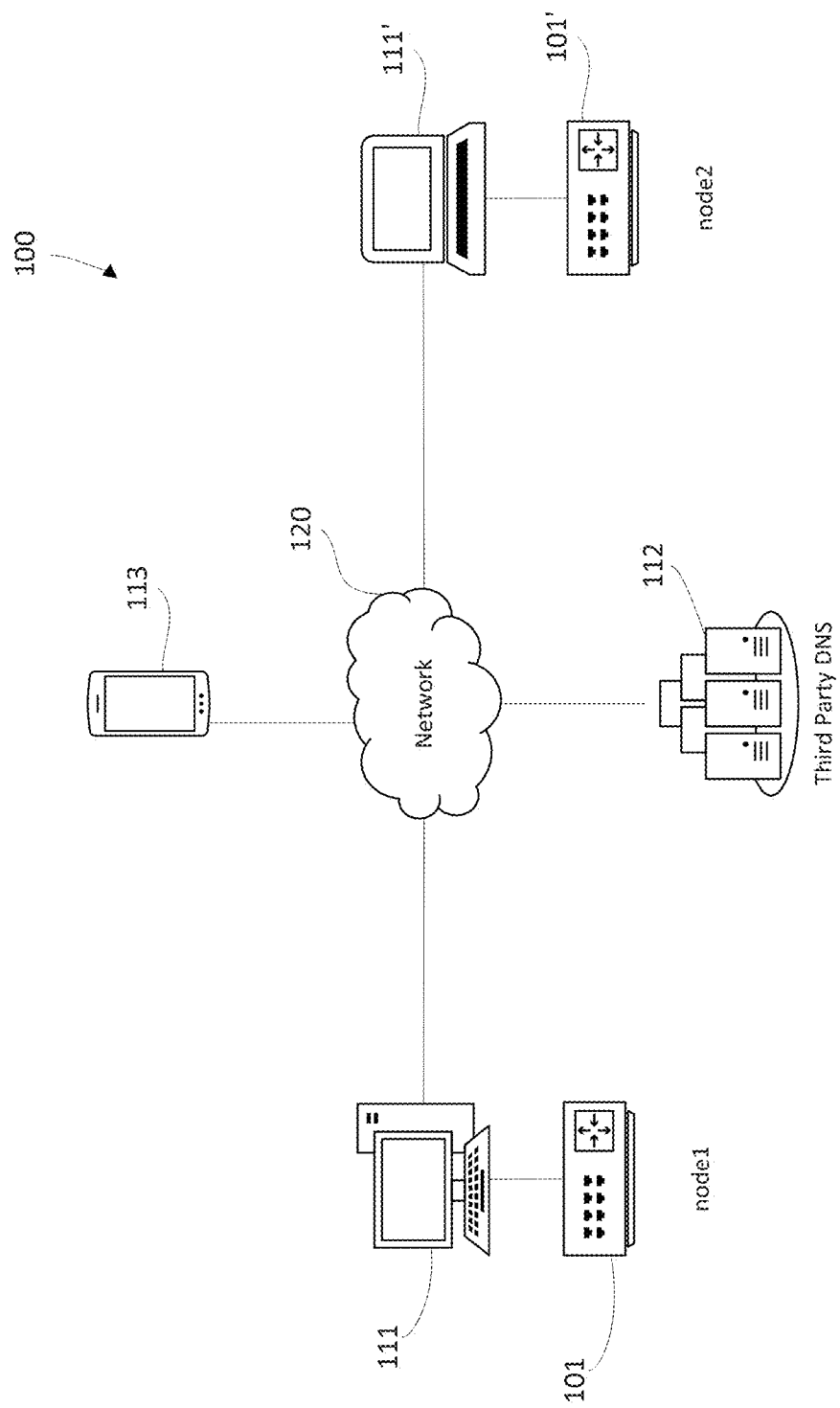
FIG. 1 is a diagrammatic representation of an exemplary system for providing secure dynamic address resolution and communication.

In one embodiment, a system 100 of the present invention for secure dynamic address resolution and communication may be implemented as generally represented in FIG. 1. Accordingly, the system 100 generally comprises a plurality of nodes including a first node 101 and a second node 101', each configured to dynamically route communication to a specified destination node, based at least on locally stored address at the transmitting node. The node(s) 101 and 101' may each be communicably connected to a computer 111 and 111', in order to redirect communication or data from the computers to each other and to other computers and/or nodes over a network 120, over one or more transmission protocol(s).

The nodes 101, 101' or devices may comprise a general purpose computer comprising a central processing unit (CPU) 111, which may be a single core or multi core processor, memory (random-access memory, read-only memory, and/or flash memory) or primary memory for high-speed storage of executing programs, electronic storage unit (e.g., hard disk) or secondary memory for storing data, communications interface 112 (e.g., network adapter) for communicating with other devices or computers over a network, and/or peripheral device(s) 113 in communication with the CPU 111 that enable input/output of the application server. The nodes 101, 101' may comprise a thin client or specialized computer for performing the functionality directed to secure and dynamic routing and communications described herein, including but not limited to Raspberry Pi, Arduino Uno, BeagleBone Black, Banana Pi, PandaBoard, LinksSrite pcDuino, Intel Galileo, Intel NUC, Odroid-C1, and other hardware and respective software for supporting the functionality of the present invention as known to those skilled in the art. In one embodiment, a node 101 of the present invention may be implemented on a mobile device under an iOS, Android, or other mobile operating system or platform, as illustrated by node 113 in FIG. 1.

Drawing attention to FIG. 7, a node 101 (or 101') may comprise software or programmable instructions stored there on, including a domain name system server 710, and one or more of a firewall 720, email server 730, file server 740, and web server 750. Different combinations of these components, modules, or software, may be implemented in conjunction with the domain name system that allows for the direct resolution of a current address associated with another device.

The firewall 720 may comprise software that monitors and controls incoming and outgoing network traffic, based on predetermined security rules that might be set by a user. A user may, for example, add a number of trusted addresses and/or protocols that are assumed to be secure, block various addresses and/or protocols, and/or set combinations of rule based allowance or rejection of various traffic.

The domain name system (DNS) server 710 may comprise software for implementing a directory for associating identifiers (such as email addresses, web addresses, ftp addresses) or other identifiers with the current Internet or other network reachable address of another node, for direct communication to the same without having to resolve that address from a third party. The DNS server may comprise an authoritative server or recursive server and may comprise caching functionality, the ability to host and/or resolve wildcard records. The DNS server may comprise, for example and without limitation, BIND, Cisco Network Registrar, DNS Blast, Dnsmasq, djbdns, gdnsd, Knot DNS, MaraDNS, Microsoft DNS, Nominum Authoritative Name Server, Nominum Vantio, NSD, pdnsd, Posadis, PowerDNS, Simple DNS, dnrd, YADIFA, Yaku-NS, combinations or other programmed equivalents thereof.

The email server 730 may comprise mail transfer agents (MTA), mail delivery agents (MDA), and other computer software for providing email or message handling services. The email server may support one or more of POP3, IMAP and/or SMTP protocols. The email server 730 may comprise, for example and without limitation, Atmail, Apache, Axigen, Bongo, Citadel, Exmin, Haraka, hMailServer, Mailtraq, Mailtraq, Microsoft Exchange Server, MDaemon, MeTA1, Postfix, qmail, qpsmtpd, Sendmail, Smail, VPOP3, WinGate, XMail, Zimbra, ZMailer, and other equivalents thereof. In one embodiment, mail filtering programs may additionally be implemented.

The file server 740 may comprise sharing disk access of the node 101 and/or the computer or storage connected to the node 101 or local network thereof. The file server 740 may comprise a file transfer protocol (FTP) server that allows the node to act as a host to another node or device over a TCP-based network, such as the Internet. The file server 740 may comprise security features, and may be secured with SSL/TLS, SSH, or other encrypted and/or secure protocols known to those skilled in the art. In other embodiment, the file server 740 may utilize the server message block (SMB) protocol.

The web server 750 may comprise software or combinations of instructions that when executed, processes requests via the HTTP protocol. A user may access the web server 750 via a web browser as known to those skilled in the art, including but not limited to Internet Explorer, Google Chrome, Mozilla Firefox, etc. The web server 750 of the node may be implemented via an Apache server, IIS, nginx, GWS. The web server 750 may be implemented via a combination of one or more of Apache, Cherokee, Lighttpd, Perl, PHP, Python, MariaDB, MySQL, and/or other appropriate software or solution stacks known to those skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof, known to those skilled in the art that allows a programmer to develop the methods and computer programs described within this application.

The node 101, 101' may comprise a user interface that allows a user to access and interact with configurations thereof. The user interface may be proprietary and may comprise a custom developed mobile or desktop application(s). Alternatively, or in addition to, the user interface may comprise a web browser, mobile browser, or other application or executable code that allows for communication and visualization of information. The node is further configured with executable or interpretable computer code that allows it to perform the processes described within this application. The user interface may be implemented via a computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations, and combinations thereof.

In one embodiment of the present invention and as illustrated at FIG. 8, a user of the present invention may be able to pair a plurality of devices, such as at least a second node with a first node via a graphic user interface. A node may comprise a thin client connected to a router of the user and may be accessible via wired LAN or WiFi connection, in other embodiments, NFC technology may similarly be utilized. The node may comprise a web server having thereon instructions of configuring the functionality of the node via a graphical user interface as illustrated by the wireframe of FIG. 8, via a standard web browser. A user may add, edit, or delete pairings from the first node (node1) to other nodes as shown. For example, an email address user@domain.xyz and a web address of domain.xyz may be associated with a second node having current IP address 1.23.45.67.890, such that any email or web communications may be sent directly to the current address. In one embodiment as explained in detail below, the current address may be updated dynamically via dynamic DNS means, such as receiving new addresses from another paired node, as that paired node detects a network change. The current address may refer to an IPv4, IPv6, MAC address, general host name, a domain name utilizing another DNS service, or any other address or identifier for reaching a paired node for communication. In order to utilize the functionality of the present invention, a user may set the local (LAN) IP address associated with the node within an email client, such that all email traffic, or traffic of a particular type, or all traffic, may be routed through the node for domain name resolution.

As such, in one embodiment, the node of the present invention may further comprise functionality including an email server, wherein a user may add, edit, delete, or otherwise configure email accounts that may be stored in whole or in part on the node itself. Conventional email functions including the ability to set email aliases, forwarding emails, etc., may be implemented. All messages may be stored locally on the node in one embodiment, in order to ensure safety and security of the messages. In one embodiment, firewall services may be implemented on the node.

The computers 111, 111' may refer to any mobile device, tablet, desktop or laptop computer, wearable electronic device, or other device or combination of circuits structured and configured to communicate with another device, computer, or server over the network 120.

In at least one embodiment, a node 101 or 101' described above may be implemented as an integrated device as depicted by node 113. That is, the functionality of the present invention may be implemented as software or as a software on a chip embedded or integrated into an integrated device, such as a mobile device, phone tablet, personal computer, wearable electronic devices, or other combination of circuits structured and configured to perform the functionalities of a node described herein.

The third party DNS 112 may comprise a domain name system (DNS) connected to network 120, and may be utilized as a fallback resolution system for the present invention.

The network 120 may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 130 may comprise additional hardware components and/or devices appropriate for facilitating the transmission and communication between the various systems and devices of the present invention, such as those directed to integrated authentication, quality control or to improve content delivery such as via a content delivery network (CDN).

Various aspects of the present invention may be thought of as "products" or "articles of manufacture" typically in the form of machine (or processor) executable code, interpretable code, and/or associated data that is carried on or embodied in a machine readable medium. Machine-executable code can be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes only transitory propagating signals per se, but includes at least register memory, processor cache, RAM, and equivalents thereof.

Therefore, a machine readable medium, such as computer-executable code, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

B. Overview of the Secure Dynamic Address Resolution Process

1. Dynamic Address Resolution Between Nodes

Figure 3:
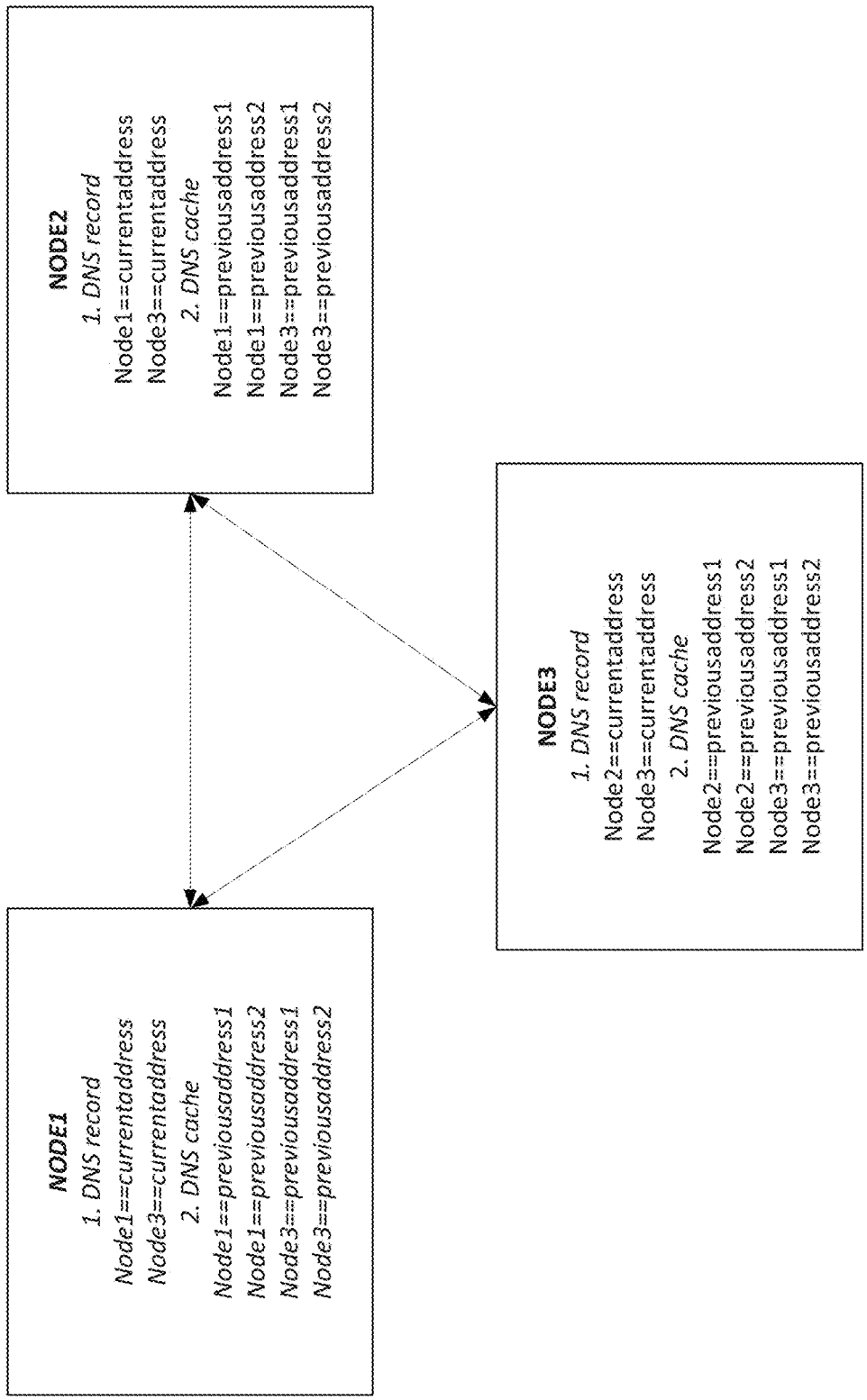
FIG. 3 is a diagrammatic representation illustrating a DNS record and cache of the various secure dynamic address resolution and communication nodes of the present invention.
Figure 4:
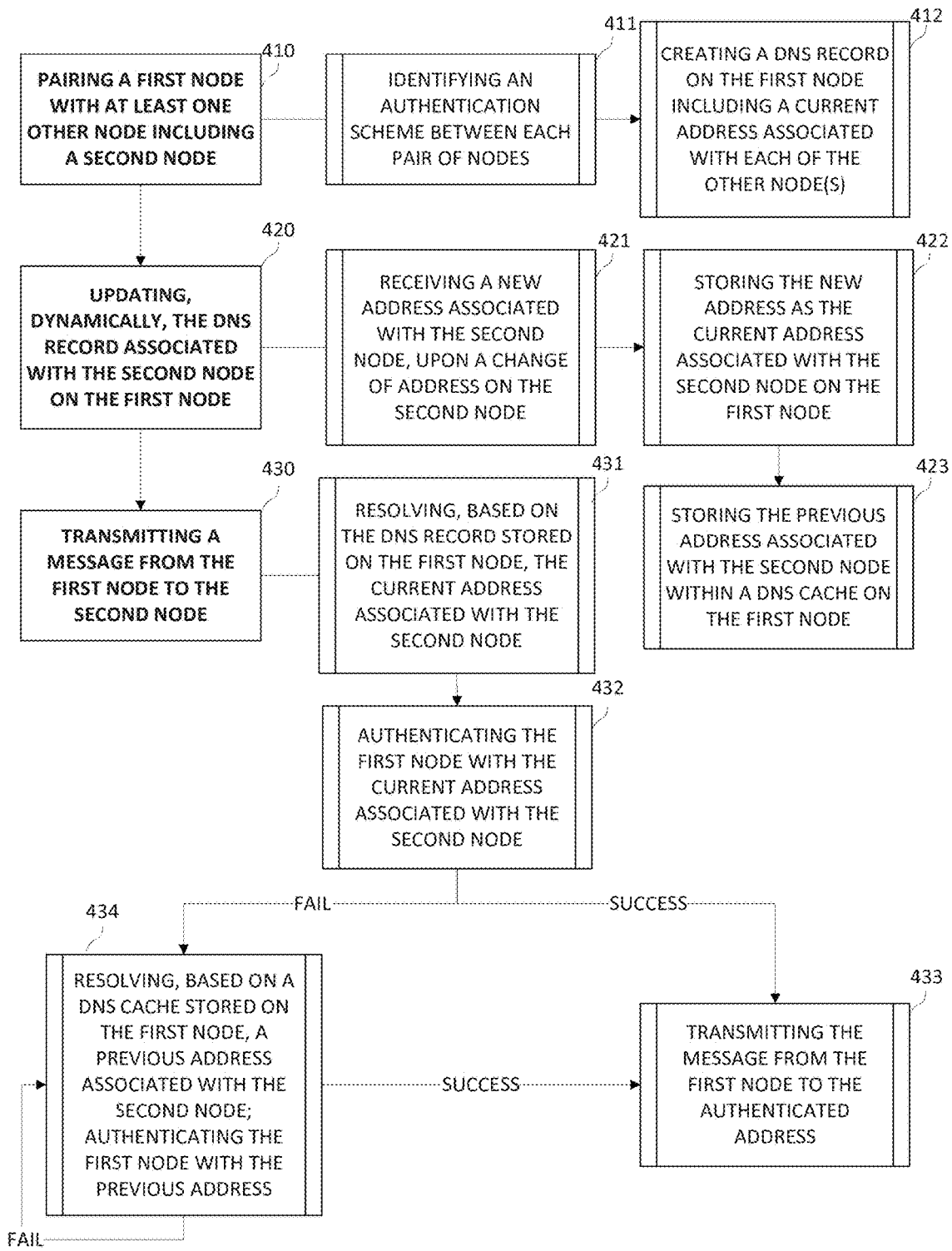
FIG. 4 is a flowchart illustrating a method for providing dynamic address resolution and communication between a plurality of nodes of the present invention.

Drawing attention to FIG. 4, one method for providing secure dynamic address resolution and communication is shown, including the dynamic address resolution process. Accordingly, a plurality of nodes is initially paired, as in 410. During the pairing process, an authentication scheme may be identified between each pair of nodes, as in 411. The authentication may require an initial pairing via a key, such as to generate a unique key, pin, or password on each node, to require entry on the other node, in order to facilitate a successful initial handshake or pairing. The key may in some embodiments comprise a MAC address, IMSEI, or other software or hardware identifier associated with a node. A DNS record may be created, as in 412, on each node, such as the first node, including a current address associated with each of the other node(s). One embodiment of a DNS record is generally illustrated at FIG. 3, in which each paired node comprises a current address of all other paired node(s), as well as a list of previous address(es) associated with the other paired node(s). In order of priority, a current address may first be attempted by a first node in resolving a second node. In the event that the second node is unreachable, a previous address may be utilized as a fallback address. As another example, attention may be drawn to FIG. 8 of the present invention illustrating a GUI of a node as explained above.

For purposes of the DNS record, a "node" may be identified by or associated with one or more of an Internet Protocol (IP) address, a DNS resolution or domain name via domain services, a general host name, MAC address, or other identifier. In one example related to the resolution of a domain name associated with or identifying a node, when a user transmits an email message to a destination address "user@domain.xyz" from a first computer 111, the message is routed through a first node 101 in communication therewith. The DNS record is checked for whether "domain.xyz" or "user@domain.xyz" is associated with a paired node, such as a second node 101'. If the DNS record on the first node 101 reflects that the destination address is associated the second node 101', it is then resolved to the current address associated with the second node 101', as indicated in the first node 101's DNS entry as illustrated in FIG. 3. The message is then transmitted to the current address associated with the second node 101'. If no record exists for the destination address in the first node 101, then it may merely bypass the DNS resolution service of the first node 101, and may be routed by conventional means through a third party DNS 112 or public DNS, and therefore message transmission remains backward compatible with conventional Internet communications, in one embodiment. Accordingly, the DNS record may comprise MX records, A records, CNAME records, TXT records, and other appropriate records known to those skilled in the art for accessing various services of transmitting various data over a network, and may comprise individualized settings, such as TTL for record caching, which may all be custom set by a user via a user interface of a node such as illustrated at FIG. 8.

Figure 2:
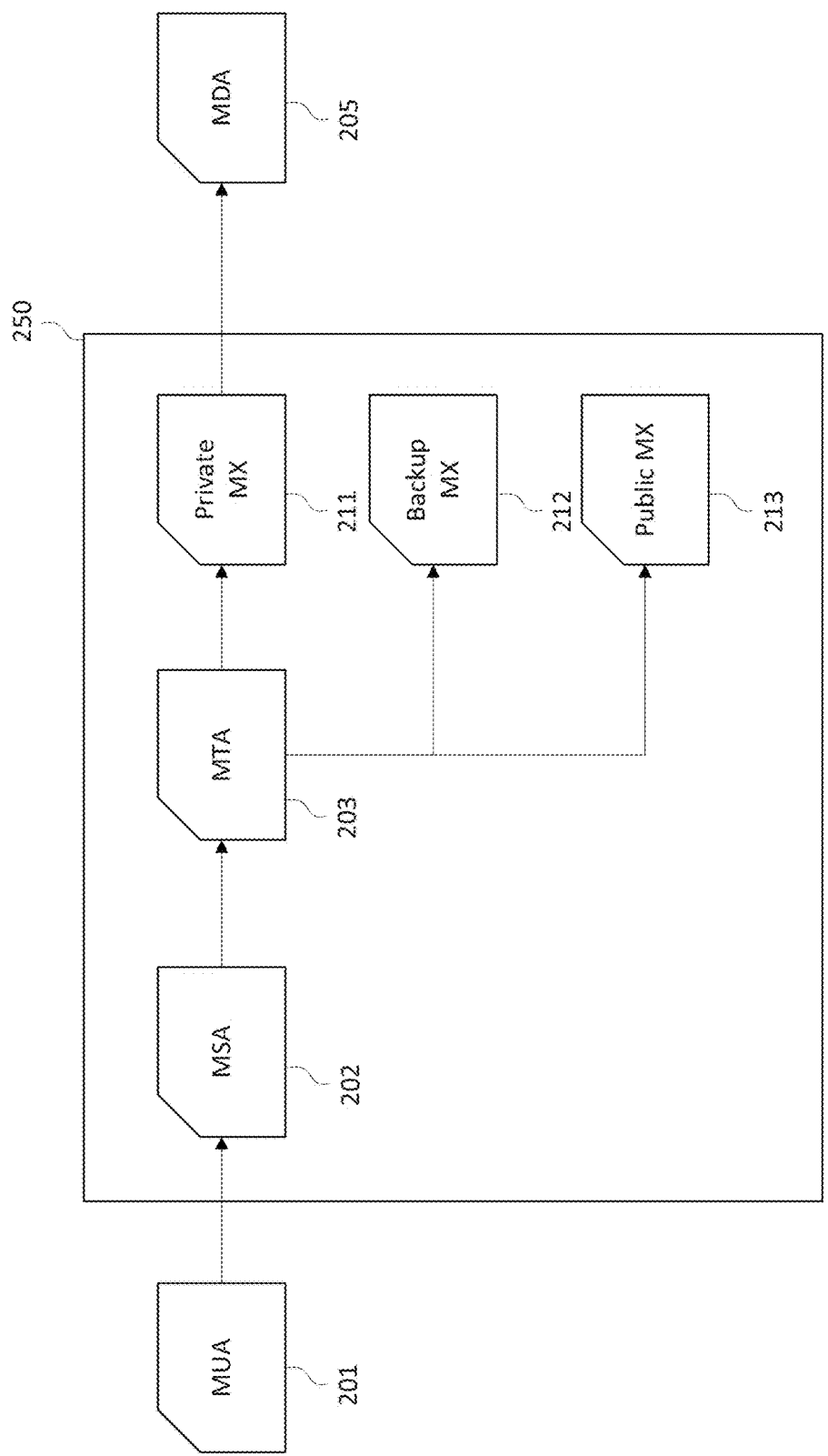
FIG. 2 is a diagramatic representation illustrating the transmission of an email message in accordance to a secure dynamic address resolution and communication system or method of the present invention.

For further illustrative purposes, FIG. 2 additionally provides a functional example of an email transmission in accordance to a secure dynamic address resolution and communication system or method of the present invention. Accordingly, a mail user agent (MUA) 201 such as an email client software may be configured to allow a user to create and send an email. The email is sent to either a mail submission agent (MSA) 202 and/or a mail transfer agent (MTA) 203, two variations of the SMTP protocol, and is then routed to a destination via a Mail Exchanger (MX). In accordance with the present invention, a private MX 211 may be utilized to resolve a private and direct address (i.e. a "current address" as described above, associated with a destination, such as user@domain.xyz), if the private MX indicates that a record exists for a node associated with the destination, such as the email address user@domain.xyz or domain.xyz. In the event that a record does exist but the resolved address is unreachable, a backup MX 212 record may be utilized, in order to attempt previous addresses associated with the destination. In the event that no record exists, traditional or public MX 213 may be utilized for the destination address, such as the mail service provided by domain.xyz. Upon resolving the address associated with the destination, the email is transferred to the mail delivery agent 205 for delivery to the destination inbox. In at least one embodiment of the present invention, a node 101 or 101' may comprise the functionalities of the MSA 202 or MTA 203, and MX 211, 212, 213, as indicated at 250.

Drawing attention back to FIG. 4, the DNS record associated with a first node may be dynamically updated across the paired nodes, as in 420. Accordingly, upon detecting a new address on the second node, the new address may be transmitted to all other paired nodes including the first node. In other words, the new address associated with the second node, upon a change of address on the second node, is received at the first node, as in 421. The new address may then be stored as the current address associated with the second node on the first node, as in 422. The previous address may be stored within a DNS cache associated with the second node on the paired node, as in 423. The DNS record of current addresses and previous addresses associated with paired nodes may be better illustrated at FIG. 3, wherein each node comprises a DNS record with all current addresses associated with other nodes. In one embodiment, new procedures and/or authentication protocols may also be transmitted or negotiated between each pair of nodes, such as to include new key(s), certificate(s), passcode(s), or other authentication or identification mechanisms or identifiers.

The dynamic updating of DNS across the plurality of paired nodes may update in real time, near real time, or at least periodically, in order to provide uninterrupted access to the secure communication and resolution protocol of the present invention. This updating may occur asynchronously, such that each pair of nodes remain in delayed synchrony with one another. That is, the Internet service provider utilized by a second node 101' and attached computer 111' may provide a new IP address upon a connection reset, or a user may physical move the second node 101' to a different location and Internet connection. As such, upon detecting a changed IP, the second node 101' may communicate this to all other paired nodes, including at least the first node 101, to be updated in the first node's DNS record.

A message may be transmitted from a first node to a second node, as in 430, in accordance local DNS resolution on the transmitting node or in this case the first node. The current address associated with the second node in resolved, as in 431, based on the DNS record stored on the first node. The first node is then authenticated with the current address associated with the second node, as in 432. The authentication may comprise authentication or validation by key as described above, during the initial pairing of the two nodes. In other words, the identity of the second node is verified first by the first node, prior to a message is authorized to be transmitted. As such, keys, login credentials such as user password, authorized certificates, or other known methods may be used. In one embodiment, if the authentication fails, such that the second node may not be reachable, a previous address associated with the second node may be resolved at the first node, as in 434, and the authentication step is reinitiated with the previous address. This step 434 may recur until a previous address returns a successful authentication, or until the list of previous addresses is exhausted. Only upon successful authentication, is the message transmitted from the first node to the authenticated address, as in 433. In one embodiment, the second node or receiving node may also request authentication from the first node or transmitting node, and if authentication fails, the second node may additionally and/or separately refuse to accept the message, even if the message is transmitted. This authentication may comprise a key check, a certificate check, or other authentication check(s) or combinations thereof known to those skilled in the art.

2. Secure Communication Between Nodes

Figure 5:
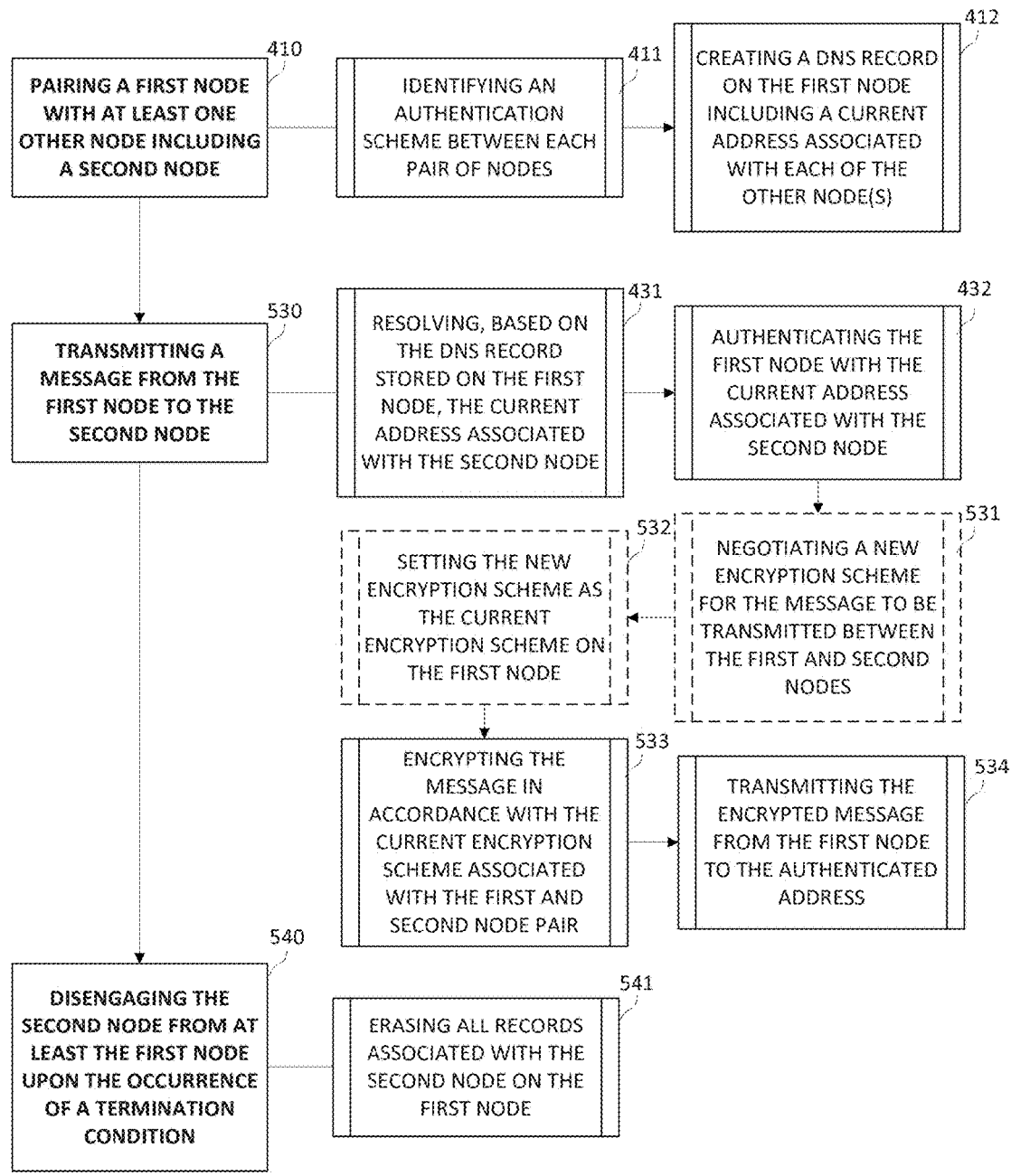
FIG. 5 is a flow chart illustrating a method for providing secure communication between a plurality of nodes o the present invention.

Drawing attention to FIG. 5, another method for providing secure dynamic address resolution and communication is illustrated, including various encryption and message security features. As such, a plurality of nodes is paired, as in 410. An authentication scheme is identified between each pair of nodes, including the first node and second node, as in 411, which may be similar to the embodiment(s) described above. To reiterate, and generally speaking, pairing between two devices allows the devices to communicate directly to each other securely while blocking unrecognized traffic or preventing transmission to an unknown node, that is, without the need for third party DNS lookup, MX relay, SMTP gateway, or remote storage. The pairing may comprise generating a key, certificate, or other authentication mechanism on each of the nodes, and requiring manual entry on the other nodes to be paired, in order to authenticate the initial connection. The pairing may require the users to verify the IMSEI, MAC, IP address, or other identifiers associated with node(s) a user may wish to pair. A DNS record is created on each node including a current address associated with each of the other node(s), as in 412.

A message is transmitted from a first node to a second node, as in 530. The current address associated with the second node, is resolved, based on the DNS record on the first node, as in 431. The first node is authenticated with the current address associated with the second node, as in 432. A new encryption scheme may then be negotiated for the message to be transmitted between the first and second nodes, as in 531. In one embodiment, this step may only follow upon successful authentication between the first and second node pair. In at least one embodiment, the highest level of encryption available between the two nodes may be identified. The identification may comprise a testing process, beginning with a test of security of the highest level, and falling back to lower levels if failure in higher level security results, until there is a successful pairing between two devices. The encryption scheme may comprise symmetric encryption, asymmetric encryption, hashing, or other methods known to those skilled in the art. For example, encryption may comprise AES, DES, Blowfish, Serpent, Twofish, RSA, combinations and alternating combinations thereof. As such, the encryption scheme may be performed at the message or the character level, for any messages or data to be transmitted.

This encryption scheme, after agreement and/or negotiation between the two nodes, may be set as the new encryption scheme to use going forward, and set as the current encryption scheme at least on the first node, as in 532. The negotiation 531 and setting new encryption 532 steps may be performed at predetermined intervals, such as prior to, after the transmission of each message, after a predetermined number of messages, or upon the occurrence of some condition, such as when a current address is dynamically updated at one or more of the paired nodes. It should further be noted that this encryption of the message occurs independently and/or in addition to the initial authentication during pairing and the following authentication prior or at message transmission between the nodes. The data or message interchange following the initial encryption scheme may then be independently encrypted using a new hash at the smallest packet level agreed. This may entail each individual character being encrypted using different encryption schema, and a random-length hash that does not exceed the agreed initial encryption scheme or algorithm. By dynamically modifying the encryption schema and the length of the hash, the parties may communicate with assurance that even if a particular character was intercepted or comprised, the entire message or data would not be.

For example, typical packet encryption sends a block of data and then uses a checksum to verify or validate that the entire block has been transported to and received by the receiver. When the data block is not received in its entirety, the whole data block is resubmitted. This is based on length of agreed buffer sizes between packet routing mechanism at the local, routing, and recipient stages. While this type of encryption is useful for reliability and path redundancy, it contains multiple vulnerabilities that the present invention overcomes by submitting the packet sizes and encryption keys randomly and/or dynamically, without the need for a checksum or a static buffer size. This type of encryption modification ensures that present packet sniffers and router backdoor vulnerabilities, are not effective at comprising data communicated over the system and method of this invention.

This encryption schema is then replicated with the node(s) and negotiated for the next submission of packets with the encryption last agreed to. So at any time if a packet is lost or is submitted without the expected encryption it is denied. By requiring a specifically encrypted data packet the node(s) shall refuse any connections from illegitimate sources. This will therefore remove any spam or unsolicited data via various communication protocols, such as emails, VoIP, or chat. In one embodiment, this dynamic encryption process may be submitted at the beginning, end, or as an aggregate map of individual packets for each message transmitted between the node(s). That is, in an email example, a node of the present invention may comprise logic that prevents the SMTP or MX processor to query or inspect packets, if the packets come from unknown or untrusted sources. This relieves the MTA of any potential security comprise because it will never inspect data that was not trusted to be sent from a paired node.

Drawing back to FIG. 5 and the next step, the message is encrypted in accordance with the current encryption scheme associated with the first and second node pair, as in 533. The encrypted message is then transmitted from the first node to the authenticated address, as in 534.

In at least one embodiment, a second node is disengaged from the plurality of nodes, such as at least the first node, upon the occurrence of a termination condition, as in 540. A termination condition may, for example, comprise a predetermined time period of unreachability of a node, an encryption error or failure to authenticate of a message received from or transmitted to the second node. Upon a termination condition, all records associated with the first node may be erased on all other paired nodes, as in 541. Records may comprise data, cache, DNS records, logs, and any information associated to or related to a disengaging node. In one embodiment, a termination condition may comprise a kill-switch key emailed to the second node. A SMTP or email agent may scan the email for the kill-switch key, and if it exists, disengaging instructions are initiated. Disengaging instructions may comprise deleting all associated logs, messages, cache, DNS, etc. on the second node. Disengaging instructions may further comprise transmitting instructions to all other paired nodes of the network or known to the second node, which may have records related to the second node such that these records may also be deleted. Another kill-switch key may comprise an entry of an entry of a P2P TCP dump with unique authentication factors, or other packet injection or transmission methods.

3. Secure Dynamic Address Resolution and Communication Between Nodes

Figure 6A:
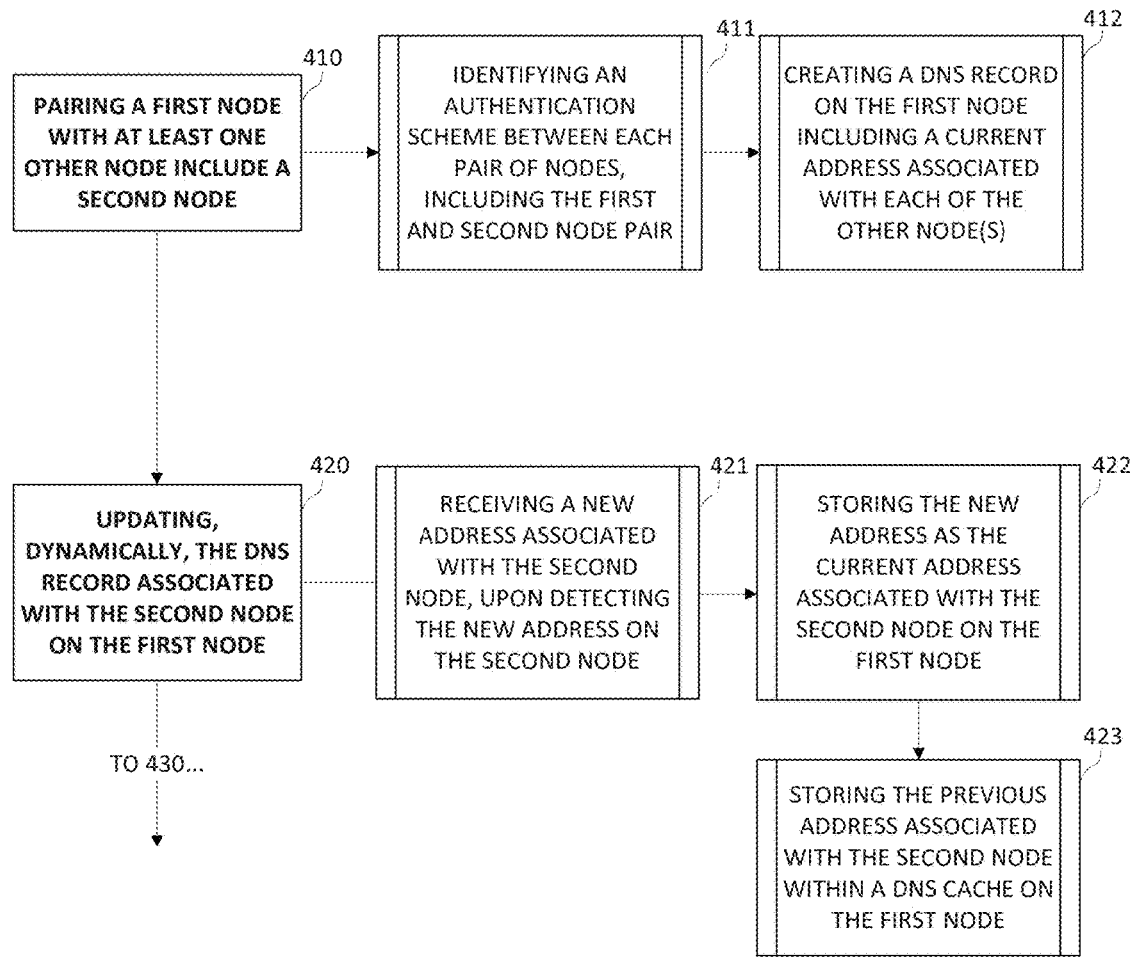
FIG. 6A is a flow chart illustrating a method for providing secure dynamic address resolution and communication between a plurality of nodes of the present invention.
Figure 6B:
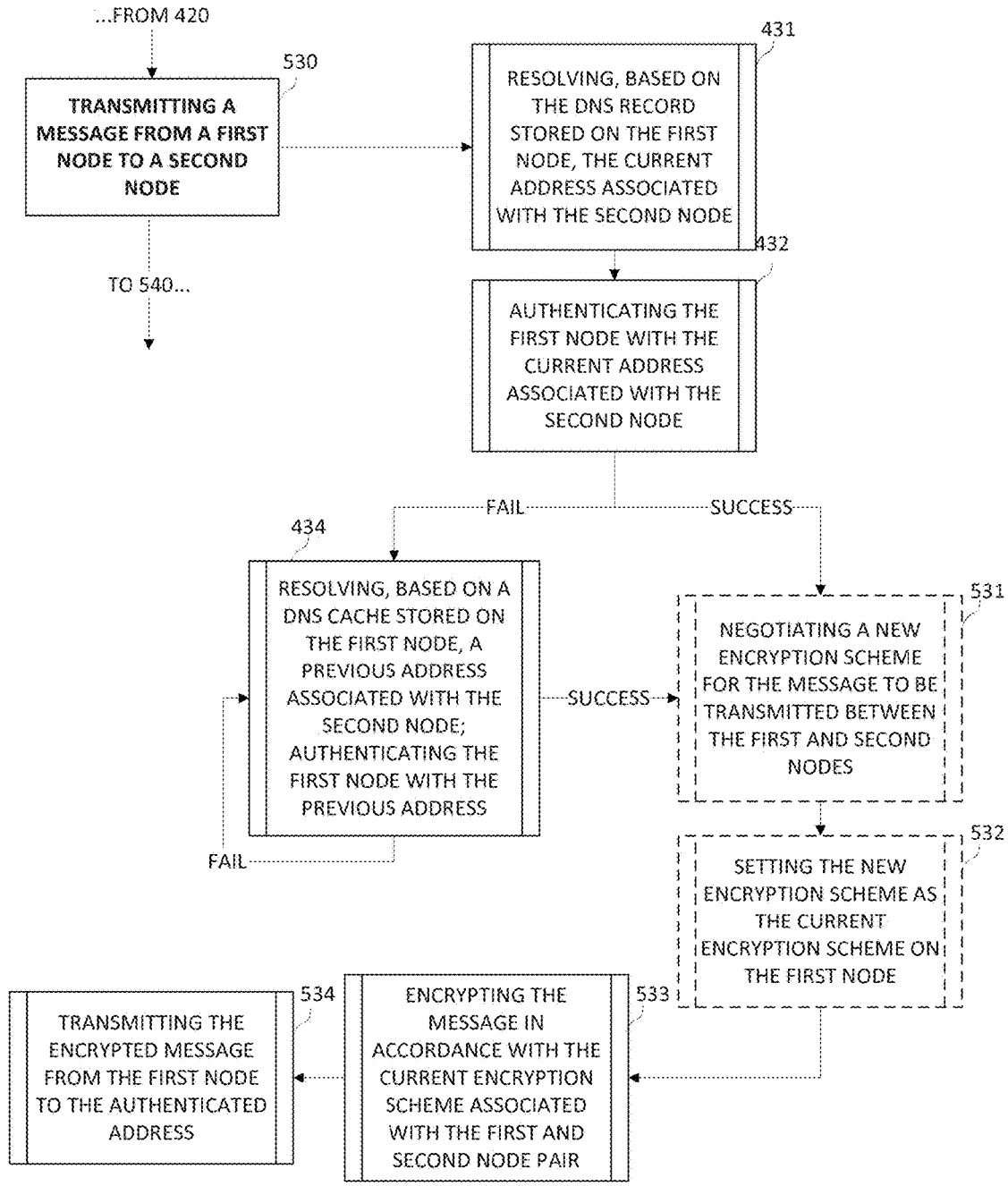
FIGS. 6B and 6C is a flow chart illustrating a method for providing secure dynamic address resolution and communication between a plurality of nodes of the present invention.
Figure 6C:
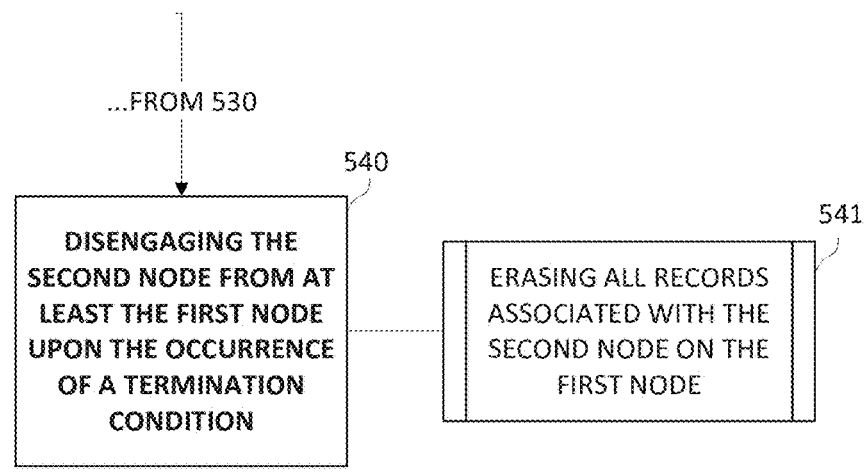
Figure 9A:
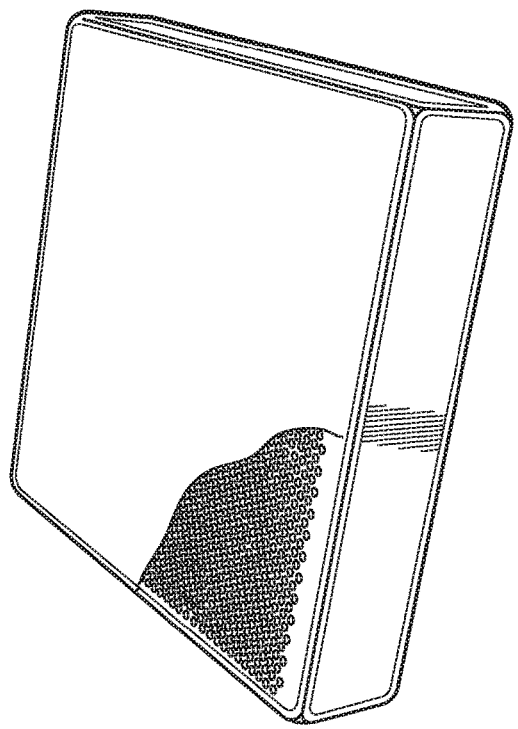
FIG. 9A is an exemplary node for providing secure dynamic address resolution and communication, in accordance with one embodiment of the present invention.
Figure 9B:
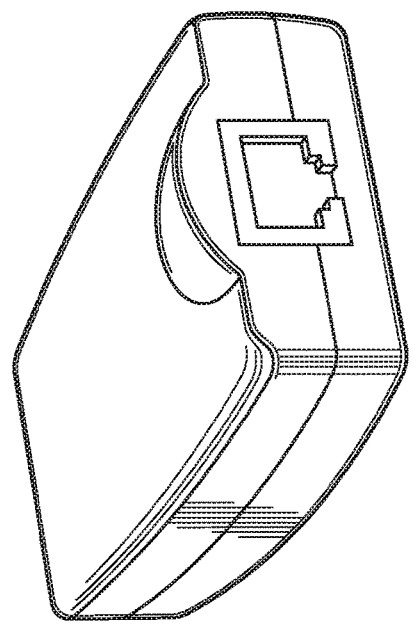
FIG. 9B is an exemplary node for providing secure dynamic address resolution and communication, in accordance with one embodiment of the present invention.

Drawing attention to FIGS. 6A-6C, a method for providing secure dynamic address resolution and communication may combine various process steps and features described above of the various methods embodied by FIGS. 4 and 5. Accordingly, a plurality of nodes is paired, such as at least the first node and other node(s) including the second node as in 410. An authentication scheme is identified between each pair of nodes, including the first and second node pair, as in 411. A DNS record may be created on the first node including a current address associated with each of the other node(s) including the second node, as in 412.

The DNS record associated with a second node may be updated dynamically on the first node, as in 420. Accordingly, a new address associated with the second node may be received at the first node, upon detecting the new address on the second node 421. The new address is stored as the current address associated with the second node on the first node, as in 422. The previous address of the second node may, in one embodiment, be stored within a DNS cache on the first node, as in 423.

A message may be transmitted from the first node to the second node, as in 530. The current address associated with the second node in resolved, as in 431, based on the DNS record stored on the first node. The first node is then authenticated with the current address associated with the second node, as in 432. In one embodiment, if the authentication fails, such that the second node may not be reachable, a previous address associated with the second node may be resolved at the first node, as in 434, and the authentication step is reinitiated with the previous address. This step 434 may recur until a previous address returns a successful authentication, or until the list of previous addresses is exhausted. Upon successful authentication, a new encryption scheme may be negotiated for the message to be transmitted between the first and second node pair, as in 531. The encryption scheme may then be set as the current encryption scheme on the first node, as in 532. As discussed above, The negotiation 531 and setting new encryption 532 steps may be performed at predetermined intervals, such as prior to, after the transmission of each message, after a predetermined number of messages, or upon the occurrence of some condition, such as when a current address is dynamically updated at one or more of the paired nodes.

The second node may be disengaged from the plurality of nodes upon the occurrence of a termination condition, as in 540. All records associated with the second node may be erased on all other paired nodes, as in 541.

Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above. The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for providing secure dynamic address resolution and communication directly between two nodes comprising: (a) pairing a plurality of nodes including at least a first node with a second node, comprising: identifying an authentication scheme for the first node and second node pair, at least upon an initial pairing of the second node, creating a DNS record on the first node including a current address associated with the second node, for direct communication with the second node without having to resolve that address from a third party, at least upon an initial pairing of the first node, creating a DNS record on the second node including a current address associated with the first node, for direct communication with the first node without having to resolve that address from a third party, (b) updating, dynamically, the DNS record associated with the second node on the first node, comprising: receiving a new address associated with the second node, upon a change of address of the second node, storing the new address as the current address associated with the second node on the first node, storing the previous address associated with the second node within a DNS cache on the first node, (c) transmitting a message from a first node to a second node, comprising: resolving, based on the DNS record stored on the first node, the current address associated with the second node, authenticating the first node with the current address associated with the second node, if the authentication fails, resolving, based on a DNS cache stored on the first node, a previous address associated with the second node, and authenticating the first node with the previous address, until a successful authentication is made or the DNS cache is exhausted, if the authentication is successful, transmitting the message from the first node to the authenticated address, and implementing a kill-switch upon occurrence of a termination condition; wherein the transmitting comprises: negotiating a new encryption scheme for the message to be transmitted between the first and second nodes, setting the new encryption scheme as the current encryption scheme on the first node, and the negotiation step and the setting step occur when a current address is updated at one or more of the paired nodes.

2. The method of claim 1 wherein the authentication step for a message transmission occurs upon the transmission of each message.

3. The method of claim 1 wherein the authentication step for a message transmission only occurs after a current address associated with the second node is updated.

4. The method of claim 1 wherein the transmitting step is performed without use of a third party mail exchange (MX) server.

5. The method of claim 1 further comprising providing backwards compatibility with external domain name resolution systems, comprising:
initially checking if a destination address is associated with a paired node, and if not, directly transmitting the message by conventional means through a public DNS, without authentication or resolution on the first node.

6. A method for providing secure dynamic address resolution and communication comprising:
(a) pairing a first node with a second node, comprising:
identifying an authentication scheme between the first node and second node pair,
creating a DNS record on the first node including a current address associated with the second node,
(b) transmitting a message from a first node to the second node, comprising:
resolving, based on the DNS record stored on the first node, the current address associated with the second node,
authenticating the first node with the current address associated with the second node,
upon successful authentication, encrypting the message in accordance with a current encryption scheme associated with the first and second node pair,
transmitting the encrypted message from the first node to the authenticated address, without the use of a third party mail exchange server, comprising:
negotiating a new encryption scheme for the message to be transmitted between the first and second nodes,
setting the new encryption scheme as the current encryption scheme on the first node, and
the negotiation step and the setting step occur when a current address is updated at one or more of the paired nodes.

7. The method of claim 6 wherein the negotiating step is performed prior to the transmission of each message.

8. The method of claim 6 wherein the negotiating step is performed after the transmission of each message.

9. The method of claim 6 further comprising providing backwards compatibility with external domain name resolution systems, comprising:
initially checking if a destination address is associated with a paired node, and if not, directly transmitting the message by conventional means through a public DNS, without authentication or resolution on the first node.

10. The method of claim 6 further comprising:
(c) disengaging the second node from the first node upon the occurrence of a termination condition, comprising:
erasing all records associated with the second node on the first node.

11. A method for providing secure dynamic address resolution and communication comprising:
(a) pairing a plurality of nodes including at least a first node with a second node, comprising:
identifying an authentication scheme for the first node and second node pair, creating a DNS record on each of the first and second node including a current address associated with the other node,
- (b) updating, dynamically, the DNS record associated with the second node on the first node, comprising:
  - receiving a new address associated with the second node, upon a change of address of the second node,
  - storing the new address as the current address associated with the second node on the first node,
  - storing the previous address associated with the second node within a DNS cache on the first node,
- (c) transmitting a message from a first node to a second node, comprising:
  - resolving, based on the DNS record stored on the first node, the current address associated with the second node,
  - authenticating the first node with the current address associated with the second node,
  - if the authentication fails, resolving, based on a DNS cache stored on the first node, a previous address associated with the second node, and authenticating the first node with the previous address, until a successful authentication is made or the DNS cache is exhausted,
  - if the authentication is successful, encrypting the message in accordance with a current encryption scheme associated with the first and second node pair, and transmitting the encrypted message from the first node to the authenticated address,
  - wherein the transmission of the message is conducted without the use of a third party mail exchange (MX) server,
- (d) providing backwards compatibility with external domain name resolution systems, comprising initially checking if a destination address is associated with a paired node, and if not, directly transmitting the message by conventional means without authentication or resolution on the first node,
- (e) disengaging the second node from the plurality of nodes upon the occurrence of a termination condition, erasing all records associated with the second node on all other paired nodes.

12. The method of claim 1 wherein said termination condition comprises an encryption error.

13. The method of claim 1 wherein said termination condition comprises a failure to authenticate a message received from or transmitted to the second node.

14. The method of claim 1 wherein implementing said kill-switch comprises erasing all records associated with the first node on the second node.

15. The method of claim 1 wherein said termination condition comprises emailing a kill-switch key to the second node.

16. The method of claim 15 wherein implementing said kill-switch comprises implementing disengaging instructions upon a successful scan and identification of the email for the kill-switch key.

17. The method of claim 16 wherein said disengaging instructions comprise deleting all associated logs, messages, cache, and DNS on the second node.

18. A method for providing secure dynamic address resolution and communication directly between two nodes comprising:
- (a) pairing a plurality of nodes including at least a first node with a second node, comprising:
  - identifying an authentication scheme for the first and second node pair,
  - creating a DNS record on the first node including a current address associated with the second node,
  - creating a DNS record on the second node including a current address associated with the first node,
- (b) asynchronously updating, dynamically, the DNS record associated with the second node on the first node, such that each pair of nodes remain in delayed synchrony with one another, comprising:
  - receiving a new address associated with the second node, upon a change of address of the second node,
  - storing the new address as the current address associated with the second node on the first node,
  - storing the previous address associated with the second node within a DNS cache on the first node,
- (c) transmitting a message from a first node to a second node, comprising:
  - resolving, based on the DNS record stored on the first node, the current address associated with the second node,
  - authenticating the first node with the current address associated with the second node,
  - if the authentication fails, resolving, based on a DNS cache stored on the first node, a previous address associated with the second node, and authenticating the first node with the previous address, until a successful authentication is made or the DNS cache is exhausted,
  - if the authentication is successful, transmitting the message from the first node to the authenticated address only after a current address associated with the second node is updated.

19. A method for providing secure dynamic address resolution and communication directly between two nodes comprising:
- (a) pairing a plurality of nodes including at least a first node with a second node, comprising:
  - identifying an authentication scheme for the first and second node pair,
  - at least upon an initial pairing of the second node, creating a DNS record independent of a public DNS record on the first node including a current address associated with the second node, and for direct communication with the second node without having to resolve that address from a third party,
  - at least upon an initial pairing of the first node, creating a DNS record independent of a public DNS record on the second node including a current address associated with the first node, for direct communication with the first node without having to resolve that address from a third party,
- (b) updating, dynamically, the DNS record associated with the second node on the first node, comprising:
  - receiving a new address associated with the second node, upon a change of address of the second node,
  - storing the new address as the current address associated with the second node on the first node,
  - storing the previous address associated with the second node within a DNS cache on the first node,
- (c) transmitting a message from a first node to a second node, comprising:
  - resolving, based on the DNS record stored on the first node, the current address associated with the second node,
  - authenticating the first node with the current address associated with the second node.

* * * * *